United States Patent [19]

Maurer

[11] Patent Number: 5,799,078

[45] Date of Patent: Aug. 25, 1998

[54] ECHO CANCELLER

[75] Inventor: Michael Maurer, Waiblingen, Germany

[73] Assignee: Alcatel Alsthom Compagnie Generale d'Electricite, Paris, France

[21] Appl. No.: 748,340

[22] Filed: Nov. 13, 1996

[30] Foreign Application Priority Data

Nov. 23, 1995 [DE] Germany .......................... 195 43 666.0

[51] Int. Cl.$^6$ ..................................................... H04M 9/00
[52] U.S. Cl. ...................... 379/410; 379/406; 379/411; 364/724.19
[58] Field of Search ..................... 379/410, 411, 379/406, 407, 409; 364/724.19

[56] References Cited

U.S. PATENT DOCUMENTS

| 4,570,036 | 2/1986 | Virdee ............................. | 379/411 |
| 4,977,591 | 12/1990 | Chen et al. ...................... | 379/410 |
| 5,062,102 | 10/1991 | Taguchi ........................... | 379/410 |
| 5,351,291 | 9/1994 | Menez et al. ..................... | 379/410 |
| 5,390,250 | 2/1995 | Janse et al. ...................... | 379/410 |
| 5,423,976 | 6/1995 | Glanville et al. ................ | 379/410 |
| 5,636,323 | 6/1997 | Umemoto et al. ............... | 379/410 |
| 5,638,439 | 6/1997 | Kawada et al. .................. | 379/410 |
| 5,687,229 | 11/1997 | Sih ................................... | 379/406 |
| 5,737,410 | 4/1998 | Vahatalo .......................... | 379/410 |

FOREIGN PATENT DOCUMENTS

| 0057953 | 8/1982 | European Pat. Off. . |
| 0098000 | 1/1984 | European Pat. Off. . |
| 0098001 | 1/1984 | European Pat. Off. . |
| 2652463 | 5/1991 | France . |
| 3120639 | 5/1983 | Germany . |
| 3431141 | 5/1986 | Germany . |
| 3730234 | 3/1989 | Germany . |
| 4305256 | 8/1994 | Germany . |
| 2123259 | 1/1984 | United Kingdom . |
| 2225517 | 5/1990 | United Kingdom . |
| 2234653 | 2/1991 | United Kingdom . |
| 8901723 | 2/1989 | WIPO . |

OTHER PUBLICATIONS

Patent Abstracts of Japan, vol. 15, No. 417 (E–1125), 23 Oct. 1991 & JP 03 173229 A (Nec Corp.), 26 Jul. 1991.

"Processing Methods to Improve Voice Communication Via Intercom Stations" by R. Wehmann et al, from the Telecommunications Engineer, 48th year, Oct. 1994, pp. 27–28.

"Combination of Noise Reduction and Echo Combination During Intercommunications", by T. Hugh et al, Communications Electronics, Berlin 43 (1993), pp. 274–280.

Primary Examiner—Ahmad F. Matar
Assistant Examiner—Jacques M. Saint-Surin
Attorney, Agent, or Firm—Ware, Fressola, Van Der Sluys & Adolphson, LLP

[57] ABSTRACT

Digital filters are used to simulate the transmission function of a real system by means of echo cancellers, where a high-speed digital signal processor with a large memory is needed to compute and update the filter coefficients. To reduce the cost of the echo canceller, an autocorrelation, i.e. the correlation of a block of a defined number of sampling values of the transmitted signal with received echoes derived from this transmitted signal, is used by the invention to determine the time periods at which an echo arrives, and at which an update of the filter coefficients then takes place. In this way the number of filter coefficients to be computed and the cost of their computation are significantly reduced, so that echo cancellers for telephone terminals can be produced in a cost-effective manner.

4 Claims, 3 Drawing Sheets

ECHO CANCELLER

TECHNICAL FIELD

The invention concerns an echo canceller which is used in transmission systems with 2-wire/4-wire crossover, for example in communications systems according to the DECT (Digital European Cordless Telecommunications) standard.

BACKGROUND OF THE INVENTION

Such 2-wire/4-wire crossovers are achieved with hybrid circuits in which a mismatch cannot technically be completely avoided in every instance, so that signal reflections can occur which have a deleterious effect on the transmission quality. The use of an echo canceller is possible in the intercom stations of communications terminals, in which the acoustical link between the loudspeaker and the microphone via the surrounding room leads to the unwanted transmission of the received signal to the speaker at the far end of the transmission path, where it is perceived as a disturbing echo.

It is basically known to eliminate the effect of echoes by means of echo cancellers, see R. Wehmann et al: Processing Methods to Improve Voice Communication via Intercom Stations; the Telecommunications Engineer, 48th. year, October 1994, page 27–28. The transmission function of the system's real transmit line-receive line, which are electrically linked to each other via mismatched hybrid circuits, is simulated as accurately as possible by means of an echo compensator. For intercom stations, the transmission function of the real loudspeaker-room-microphone system is simulated as accurately as possible. The signal received by the subscriber then passes through both the real system as well as the system that is simulated by the echo canceller, and subsequently the output signal of the echo canceller is subtracted from the echo-affected signal of the real system, thus canceling most of the echo.

Digital filters are used to implement echo cancellers whose filter coefficients can be determined in accordance with the Normalized Least Mean Square Algorithm, briefly called the NLMS algorithm, see T. Huhn, H.-J. Jentschel: Combination of Noise Reduction and Echo Combination During Intercommunication; Communications Electronics, Berlin 43 (1993), page 274–280. The necessary filter length is determined by the sampling frequency and by the echo's running time. The filter coefficients must be constantly updated in accordance with the changing echo signal. Thus, in a transmission system for example in which a new sampling value of the signal to be transmitted is produced every 125 µs, and where the echo's running time is 70 ms, 560 sampling values must be stored and processed, namely:

$$70 \text{ ms} \cdot \frac{8 \text{ sampling values}}{1 \text{ ms}} = 560 \text{ sampling values.}$$

To obtain a useable approximation of the echo's time function, a digital signal processor with a high processing speed and a large memory are required to implement the echo canceller, so that this possibility can technically only be realized at a high cost. Because of their high cost, the known solutions themselves are not suitable to fulfill the commercial requirements of qualitatively satisfactory intercommunication stations in particular.

A difficulty when determining the filter coefficients is that the actual pulse response of the simulated system can only be determined when no interfering effects are present. When a digital filter is used, it must reliably differentiate between local echoes and noise or an active local speaker, and between line echoes and an active local speaker, to determine filter coefficients only with a silent local speaker and a silent remote speaker, because essentially only echo signals are then received. It is known to perform a correlation between the received signal and the transmitted signal to establish the most favorable instant for determining the filter coefficients, see DE 43 05 256 A1. This publication describes how the correlation analysis is used to establish at what moment an acoustical coupling factor is determined to be the measure of an echo signal. However, the application fails in practice because of the very extensive computation effort required for the correlation analysis.

SUMMARY OF THE INVENTION

The invention intends to fulfill the task of building an echo canceller with a digital filter in a way so that the number of filter coefficients to be determined and the effort for their computation becomes so small, that the echo canceller can be used as a cost-effective component in a communications system according to the DECT standard.

The invention fulfills this task by an echo canceller which is switched between a transmit line and a receive line in a communications system, whose transmission function is determined by a digital filter, characterized in that the transmission function is updated when the result of a correlation between a block formed of a defined number of sampling values from transmitted signals and a received echo signal derived therefrom, exceeds a defined threshold value.

The nature of the invention is that a block autocorrelation, whereby the correlation of a block of a defined number of sampling values of the transmitted signal is designated by the received echoes derived from this transmitted signal, is used to determine the instants at which an echo arrives and at which the coefficients of the digital filter are then updated.

BRIEF DESCRIPTION OF THE DRAWINGS

The operating mode of the invention is explained in the following by means of a configuration example. The pertinent drawings are.

BEST MODE FOR CARRYING OUT THE INVENTION

Figure 1:
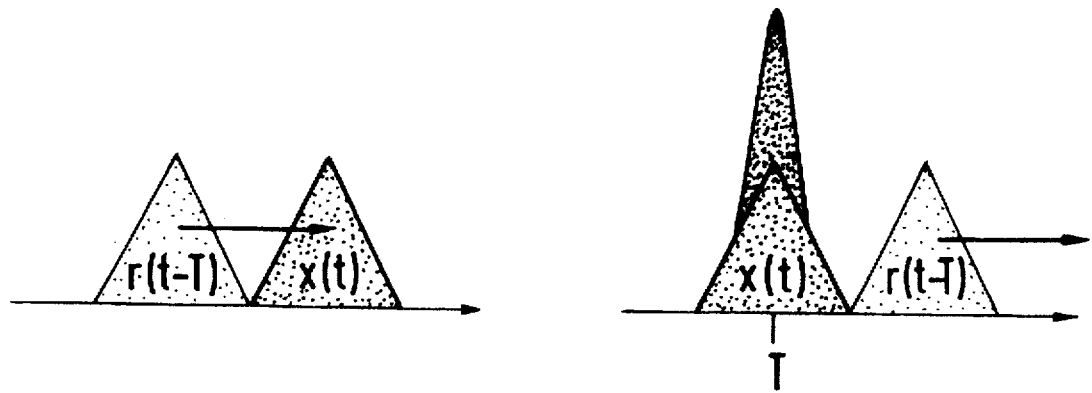
FIG. 1 a schematic illustration of the autocorrelation.

It is basically possible to determine the timely position of an echo by means of autocorrelation. To that end according to FIG. 1 the average time product of the function x(t) is formed with the same function r(t-T) displaced by time T, thereby determining the autocorrelation between the transmitted signal and the received echo.

Figure 2:
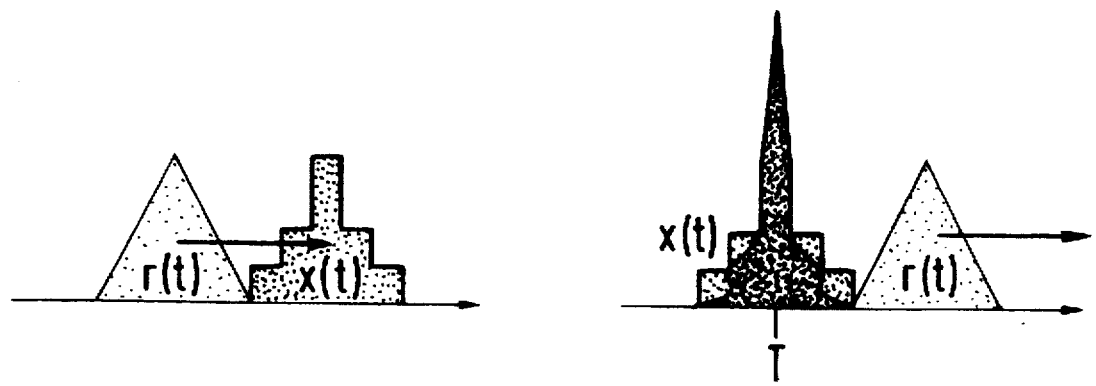
FIG. 2 a schematic illustration of the block autocorrelation.

To avoid the extensive computation effort for the autocorrelation of individual sampling values, an autocorrelation of selected blocks is performed according to FIG. 2. The function x(t) in FIG. 2 comprises five representative values for example, each of which was determined from a block. Using block autocorrelation with the echo signal r(t), an average block value is determined whose largest value indicates in which block the echo is the greatest. This technique is generally used to determine the time periods during which echoes occur.

Figure 3:
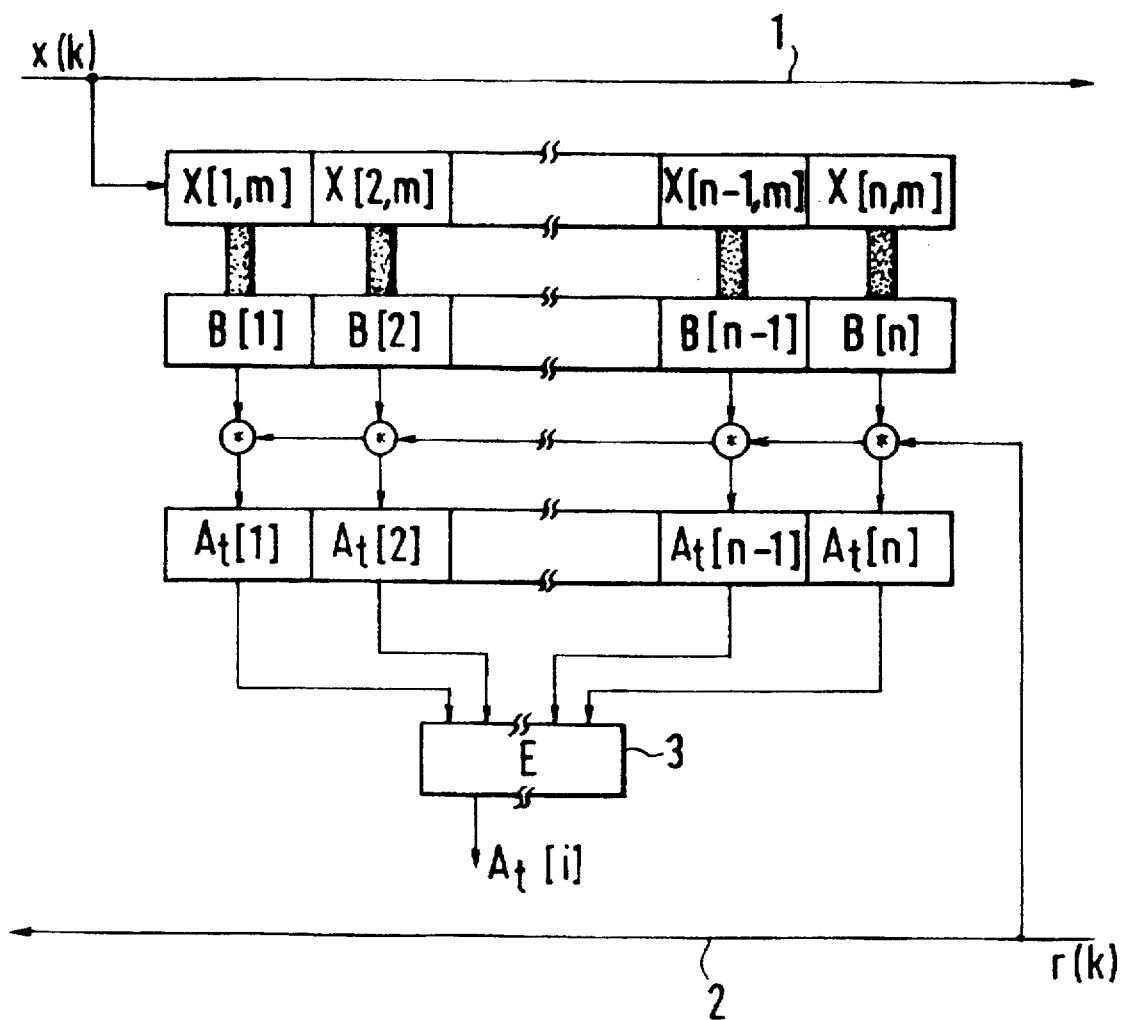
FIG. 3 a functional circuit diagram of a block autocorrelator.

According to FIG. 3, the block autocorrelator is connected between the transmit line 1 and the receive line 2. A determined number m of sampling values x(k) of the transmit signal, for example m=8, is grouped into a block $B[n]$ comprising the elements $X[n,m]$, where n=the number of blocks. A representative block value is computed from the number m of sampling values x(k) for each block $B[n]$. The computation takes place according to the following specification:

$$B_r[i] = (1-\alpha) \cdot B_{r-1}[i] + \alpha \cdot X[i,1] \quad (1)$$

with $0<\alpha<1$
and $1 \leq i \leq n$,
where $B_r[i]$ is the current representative block value and $B_{r-1}[i]$ is the representative block value previously determined in time.

Only the first element $X[i,1]$ of a block $B[i]$ is required for this computation (1). The factor $\alpha$ provides the effect of the second addend on the representative block value and thereby the changing speed of the representative block. $\alpha = 2^{-4}$ is often selected for the practical case.

It is also possible however to determine the representative block value from the first element $X[i,1]$ and the last element $X[i,m]$ of a block $B[i]$. The computation of the representative value then takes place in accordance with $$B_r[i] = B_{r-1}[i] + X[i,1] - X[i,m] \quad (2)$$

Each representative block value $B_r[i]$ is multiplied by the sampling values r(k) of the received echo signal derived from the signal in the transmission direction. An average block value $A_r[i]$ is computed from the products according to $$A_r[i] = (1-\beta) A_{r-1}[i] + \beta \cdot B_r[i] \cdot \frac{r(k)}{\text{const.}} \quad (3)$$

with $0<\beta<1$
and $1 \leq i \leq n$,
where $\beta$ is selected in accordance with the same previously cited considerations.

A logic circuit 3 is used to determine from the average block values $A_r[1] \ldots A_r[n]$ at what time an echo canceller must be activated. The average block values $A_r[1] \ldots A_r[n]$ are the result of the block autocorrelation between the signals transmitted in a block and the echo signals.

Under the premise that an echo essentially only occurs in a block, the logic circuit 3 determines the largest average block value $A_r[i]_{max}$ which thus shows the existence of an echo. The sampling values in the thus determined block are then used to compute the transmission function of the echo canceller. Depending on the block size and the computation output of a digital signal processor, and in accordance with the required accuracy, it is possible to use further blocks $A_r[i]$, which are adjacent to the largest average block value, to compute the transmission function of the echo canceller. Whether only the block with the largest average block value $A_r[i]_{max}$ or further blocks $A_r[i]$ which are adjacent to this block, are used to compute the transmission function of the echo canceller depends on the size of a threshold value whereby the logic circuit 3 rates the average block values. The smaller the threshold value, the larger the probability that more than one block is used to compute the transmission function of the echo canceller.

In the event the echo arrives at different times, not only is the maximum average block value $A_r[i]_{max}$ determined, but a number i of blocks with the largest average block values $A_r[i]$ is determined from the n blocks.

Figure 4:
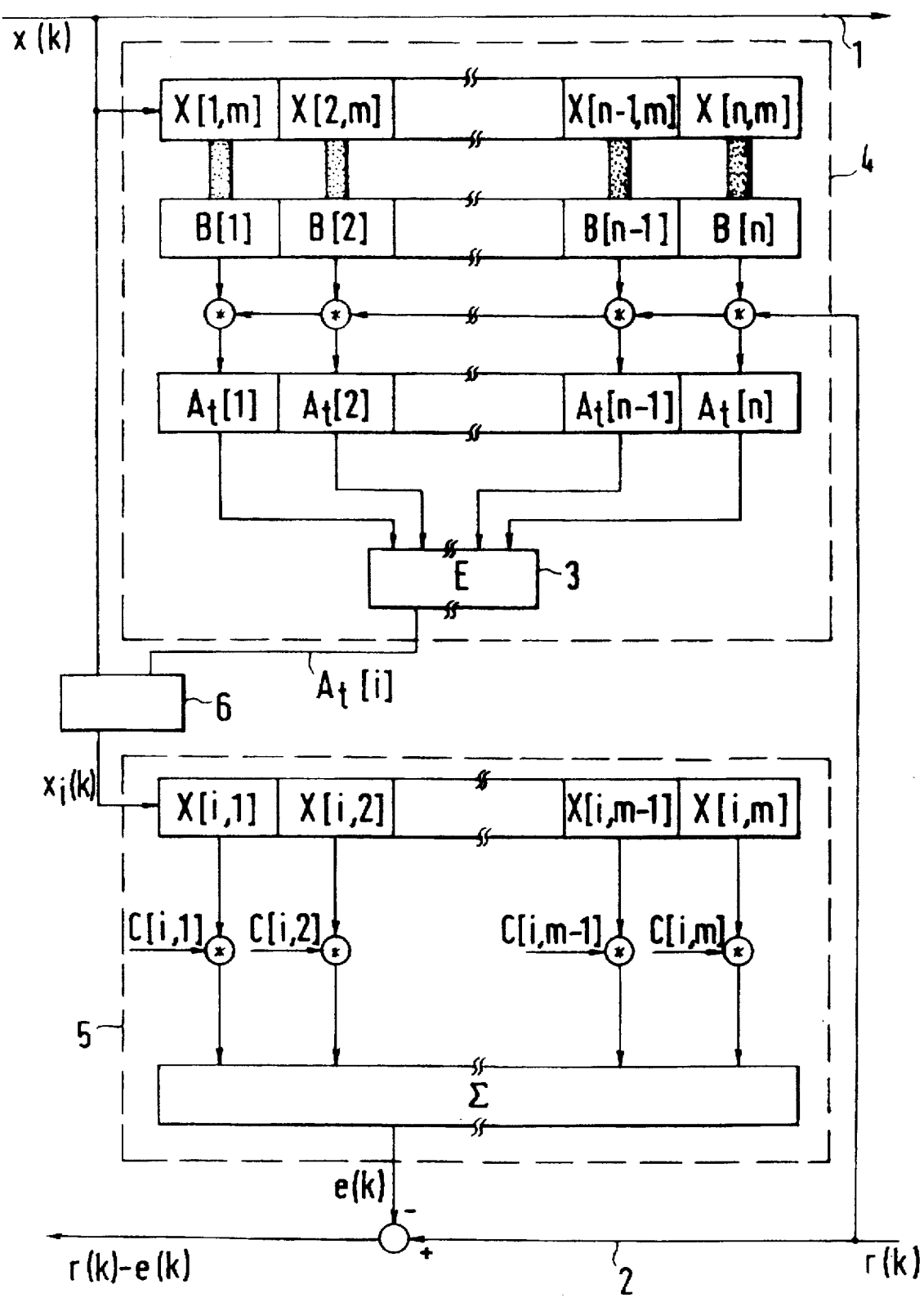
FIG. 4 a functional circuit diagram of an echo compensator with a block autocorrelator.

FIG. 4 illustrates the interconnection of a block autocorrelator 4 and an echo canceller 5. The echo function e(k) is now simulated for each selected block i, and is subtracted from the echo-affected signal r(k). The function of a gate circuit 6 is to ensure that only the sampling values $x_i(k)$ of the selected blocks i are used to compute the transmission function of the echo canceller 5. The transmission function of the echo canceller 5 is formed by a digital filter, where according to equation (4) the sum of the products $X[i,p]$ is formed of the selected blocks i and the pertinent filter coefficients $C[i,p]$; in that case p indicates the number of sampling values within one block.

$$e(k) = \Sigma^m_{p=1} X[i,p] \cdot C[i,p] \quad (4)$$

Computation time is advantageously saved by selecting the relevant blocks $X[i,p]$ for the echo cancellation, as opposed to the state of the art. It is therefore no longer necessary to form the sum of the products of all the sampling values x(k) and the filter coefficients. In addition, the solution of the invention also reduces the number of filter coefficients which must be computed.

What is claimed is:

1. An echo canceller (5) which is switched between a transmit line (1) and a receive line (2) in a communications system, whose transmission function is determined by a digital filter, characterized in that a block formed of a defined number of sampling values from transmitted signals is correlated with a received echo signal derived therefrom and a result of the correlation is compared to a defined threshold value, and if the result of the correlation exceeds the defined threshold value, the transmission function is updated.

2. An echo canceller (5) as claimed in claim 1, characterized in that the correlation between the block (B[n]) of transmitted signals and the echo derived therefrom is carried out in a way so that the sampling values of the transmitted signal (x(k)) are divided into a number of blocks (B[n]) from which in each case a representative block value ($B_r[i]$) is computed from the sampling values, that each representative block value ($B_r[i]$) is multiplied by the echo signal (r(k)) resulting in a number of average block values ($A_r[n]$) from which at least one average block value ($A_r[n]$) which exceeds a defined threshold value is selected by means of a logic circuit (3).

3. An echo canceller (5) as claimed in claim 2, characterized in that with a singular echo the updating of the transmission function of the digital filter takes place in the block whose average value is determined by the singular echo, and that additionally, if required, at least one block which precedes in time and one block which follows in time are used to update the transmission function of the digital filter.

4. An echo canceller (5) as claimed in claim 2, characterized in that with a number q of echo signals distributed in time, the largest average block values which are derived from the q echo signals are determined in each case, and in this way determining the blocks which are used to update the transmission function of the digital filter.

* * * * *